B. F. HISERT.
Horse Hay Fork.
No. 52,805. Patented Feb. 20, 1866.
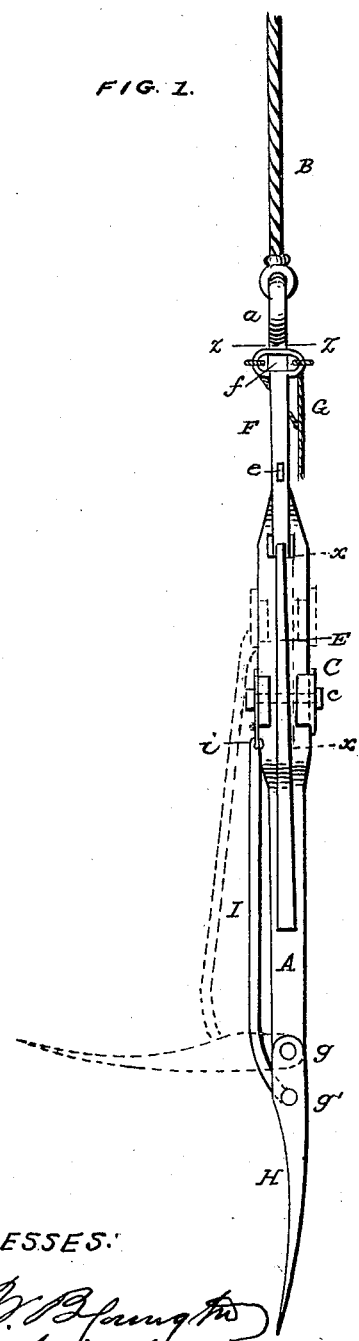
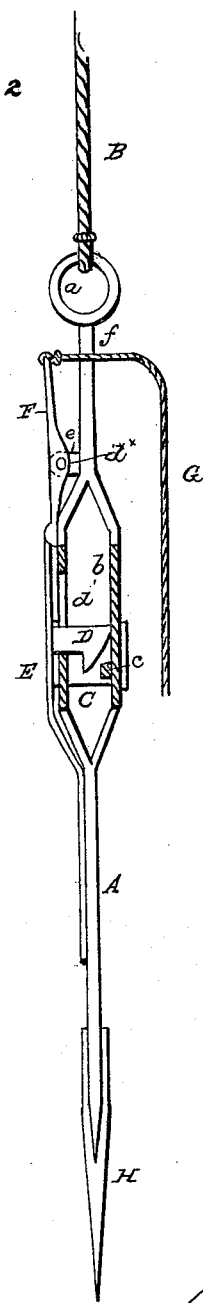
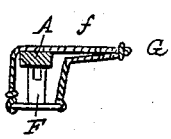
WITNESSES:
INVENTOR.

UNITED STATES PATENT OFFICE.

B. F. HISERT, OF NORTON HILL, NEW YORK.

IMPROVEMENT IN HORSE HAY-FORKS.

Specification forming part of Letters Patent No. 52,805, dated February 20, 1866.

*To all whom it may concern:*

Be it known that I, B. F. HISERT, of Norton Hill, Greene county, State of New York, have invented a new and Improved Horse Hay-Fork; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, an edge view of the same, partly in section, as indicated by the line $x\ x$, Fig. 1; Fig. 3, a horizontal section of the same, taken in the line $y\ y$, Fig. 1.

Similar letters of reference indicate like parts.

This invention relates to a new and improved implement for unloading hay and depositing it in barns by means of a horse, and which are commonly termed "horse hay-forks."

The object of the invention is to obtain an implement for the purpose specified which may be constructed at a very moderate expense, be capable of being manipulated with the greatest facility, and not liable to be impeded or interfered with in its operation by obstructions in a barn, such as beams, braces, &c., of the framing, and which may be tripped to discharge its load at any point in the path of its upward movement, however much it may turn while being hoisted or elevated, and whatever position the tripping-latch may have relatively to the operator.

A represents a bar, which may be constructed of wrought or malleable cast-iron, having an eye, $a$, at its upper end, in which the hoisting-rope B is secured, and formed with an open space or loop, $b$, at a short distance below the eye $a$, as shown clearly in Fig. 2. On this loop portion of the bar A there is fitted a slide, C, so arranged as to work freely up and down, and said slide has a locking-bar, $c$, fitted horizontally in it, said bar extending through the loop.

D is a catch, which passes through a slot, $d'$, in one side of the loop $b$, said catch extending entirely across the loop and having its under side beveled, as shown at $d$. The outer end of this catch is attached to a spring, E, near the upper end of the latter, the lower end of said spring being attached to the bar A. This spring E has a tendency to keep the catch D shoved into the loop $b$ to its fullest extent.

F is a lever or tripping-latch secured by a pivot $d^\times$ in a short arm, $e$, which projects from the bar A, and the upper end of the spring E bears against the outer side of the lower end of the lever or latch F. To the upper end of the lever F the tripping-rope G is attached, said rope being formed with a loop, $f$, (shown clearly in Fig. 3,) through which the bar A passes.

To the lower end of the bar A a tine, H, is attached by a pivot, $g$, and this tine has the lower end of a rod, I, attached to it near its inner end by a pivot, $g'$, the upper end of said rod being connected by a joint, $i$, with the slide C, as shown in Fig. 1.

When the fork is in a working position the tine H is turned up in a position about at right angles with bar A, as shown in red in Fig. 1, and the locking-bar $c$ of the slide C is above the catch D, the catch holding the tine in the position shown in red, so that said tine may hold or retain its load. The fork is hoisted by means of the usual tackle, the horse being attached to it in the ordinary manner, and when the fork is elevated over the spot where its load is to be deposited the operator pulls the rope G, thereby drawing the upper end of the lever or tripping-latch F toward bar A and causing its lower end to force outward from said bar the upper end of spring E, and in this manner remove the catch from the locking-bar $c$, when the tine H will immediately fall, owing to the weight of the hay on it. The hay will consequently drop off, leaving the fork in the position indicated in the drawings by black lines, and ready to be again inserted in the hay.

When the load is discharged the horse is backed and the fork is lowered, the operator grasping it and shoving it down tine foremost a proper depth into the hay and then bending the bar A over, so that it will have a position at right angles with the tine, thereby raising the slide C so that its locking-bar $c$ will throw outward the catch D in consequence of striking its beveled or rounded surface $d$ and pass above the catch. The horse is then started forward and a succeeding load elevated to the desired spot and discharged, as before.

The loop $f$ of the tripping-rope, through which loop the bar A passes, is an important feature of the invention, as it admits of the lever or tripping-latch F being operated under the pull of the rope G, even if the fork turns in its ascent. This will be fully understood by referring to Fig. 2, in which a direct pull of the rope is given the lever or latch when the rope is in the position shown in black, and an indirect pull is given when the rope is in the position shown in Fig. 3.

It will be seen that the upper end of the lever or latch will in either case be drawn toward bar A under the pull of the rope G. This turning of the fork during its elevation is a serious embarrassment in using the ordinary horse hay-fork, and swivel-rings have in some cases been applied to the upper ends of the forks to secure the hoisting-rope to; but the friction caused by the weight of the load, together with the readiness of the hoisting-rope to twist or turn, renders the swivel useless.

Having thus described my invention, what I claim as new, and desire to secure by Letters Patent, is—

1. The bar A, provided with the pivoted tine H, in combination with the slide C, connected to the tine by a rod, I, the catch D, attached to the spring E, and the bar $c$ in the slide C, all arranged to operate substantially as and for the purpose set forth.

2. The bar A, with its pivoted tine H, in combination with the rod I, pivoted to the tine H near its center of motion, the locking-bar $c$, and spring-catch, for the purpose described.

3. The combination of the catch D, the tripping-lever F, and the sliding locking-bar $c$ with the bar A and pivoted tine H, substantially as and for the purpose described.

4. The combination and arrangement of the catch D, tripping-lever F, bar A, loop $f$, and cord G, as and for the purpose described.

The above specification of my invention signed by me this 27th day of December, 1865.

B. F. HISERT.

Witnesses:
 GEO. H. HARRISON,
 ALEX. F. ROBERTS.